(12) United States Patent
Java

(10) Patent No.: US 7,757,723 B2
(45) Date of Patent: Jul. 20, 2010

(54) PAPER WEAVING KIT

(76) Inventor: Luz Java, 6 St. Mary's Drive, Walkinstown, Dublin 12 (IE)

( * ) Notice: Subject to any disclaimer, the term of this patent is extended or adjusted under 35 U.S.C. 154(b) by 0 days.

(21) Appl. No.: 11/718,682

(22) PCT Filed: Nov. 7, 2005

(86) PCT No.: PCT/IE2005/000125
§ 371 (c)(1),
(2), (4) Date: Jan. 22, 2009

(87) PCT Pub. No.: WO2006/048854
PCT Pub. Date: May 11, 2006

(65) Prior Publication Data
US 2009/0120525 A1    May 14, 2009

(30) Foreign Application Priority Data
Nov. 5, 2004    (IE) ................. S2004/0740

(51) Int. Cl.
*D03J 1/13* (2006.01)
*D03D 29/00* (2006.01)
*D03D 41/00* (2006.01)

(52) U.S. Cl. .............. 139/29; 139/1 R; 139/420 B; 139/420 R; 139/426 R

(58) Field of Classification Search .......... 139/1 R, 139/29–33, 33.5, 34, 420 R, 420 B
See application file for complete search history.

(56) References Cited

U.S. PATENT DOCUMENTS 1,556,175 A * 10/1925 Stevenson ............... 139/420 B (Continued)

FOREIGN PATENT DOCUMENTS

JP          01139844 A * 6/1989

*Primary Examiner*—Bobby H Muromoto, Jr.
(74) *Attorney, Agent, or Firm*—Holland & Knight LLP; Brian J. Colandreo, Esq.

(57) ABSTRACT

A paper weaving kit (100) has a box-like body (106). A top of the body (106) forms a weaving aid (107). A crimping apparatus (108) is mounted at one side of the body (106). A removable sheet tearing apparatus (109) is slidably mounted within the body (106) at a front end of the body (106). The sheet tearing apparatus (109) can be used to tear strips of paper from a sheet of newspaper or the like. This strip is then fed through the crimping apparatus (108) which crimps fold lines in the paper strip. The paper strip is then folded about the fold lines to form a weaving element. number of weaving elements are mounted side by side on a support panel (112) on the weaving aid (107). These are clamped against the support panel (112) by clamp (115) and thus form a number of juxtaposed warp weaving elements extending down the support panel (112). Weft weaving elements can then be woven through the warp weaving elements on the panel (112) to form a woven panel of paper weaving elements.

32 Claims, 18 Drawing Sheets

U.S. PATENT DOCUMENTS

| | | | |
|---|---|---|---|
| 1,795,838 A * | 3/1931 | Cramer et al. | 139/420 B |
| 1,829,299 A * | 10/1931 | Rosenstein | 139/420 B |
| 1,897,671 A * | 2/1933 | Millett | 139/420 B |
| 1,901,250 A * | 3/1933 | Mattler | 139/11 |
| 1,969,855 A * | 8/1934 | Richter et al. | 139/420 B |
| 1,995,696 A * | 3/1935 | Wallach | 57/235 |
| 2,021,331 A * | 11/1935 | Sackner | 160/371 |
| 2,418,215 A * | 4/1947 | Lambert | 139/420 B |
| 2,557,819 A * | 6/1951 | Fischer et al. | 139/385 |
| 2,704,878 A * | 3/1955 | Green | 206/459.5 |
| 2,734,532 A * | 2/1956 | Light | 139/420 B |
| 2,750,652 A * | 6/1956 | Petroske | 428/94 |
| 6,506,697 B1 * | 1/2003 | Samel | 442/286 |

\* cited by examiner

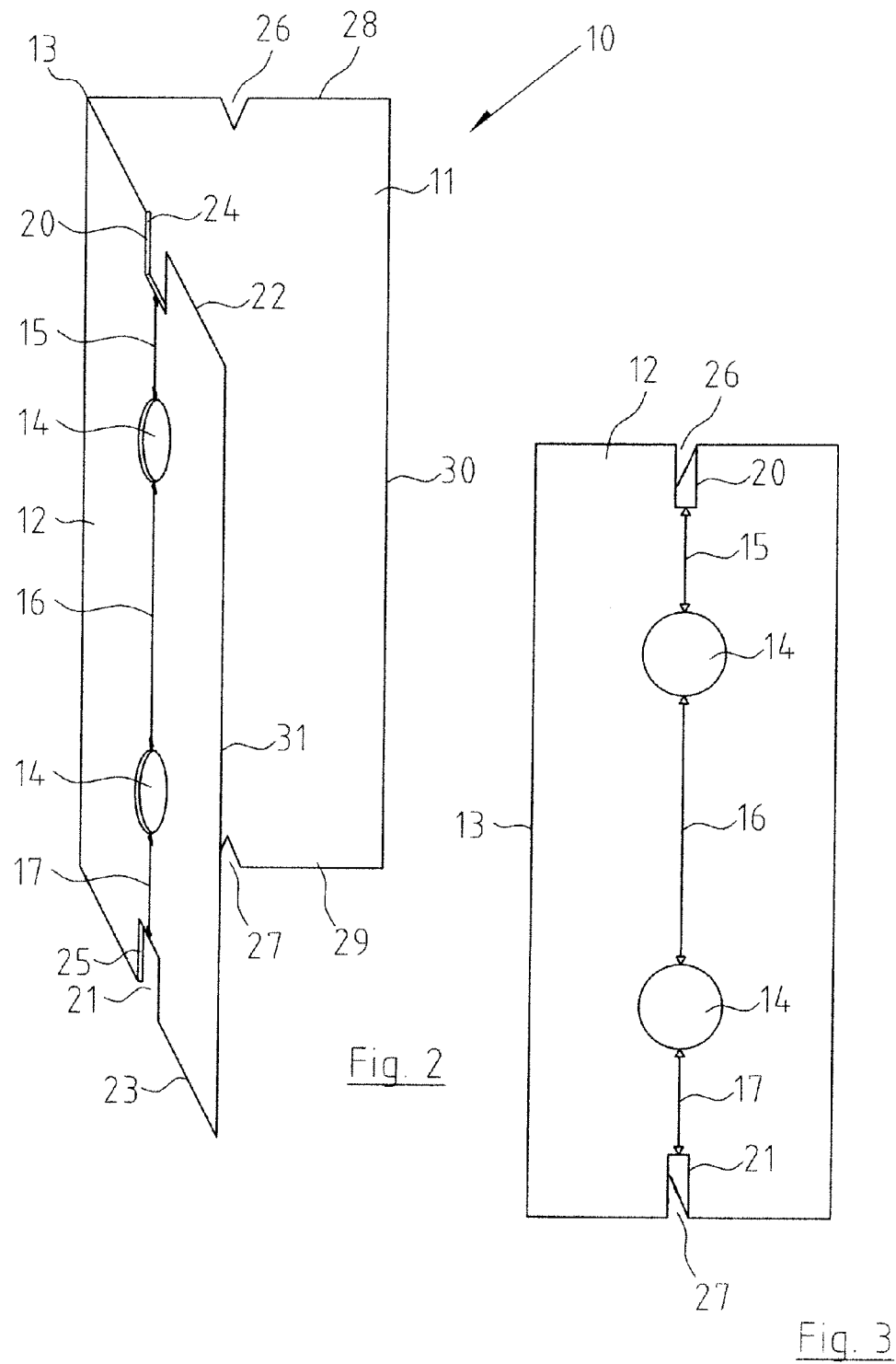

(a) (b) (c) (d)

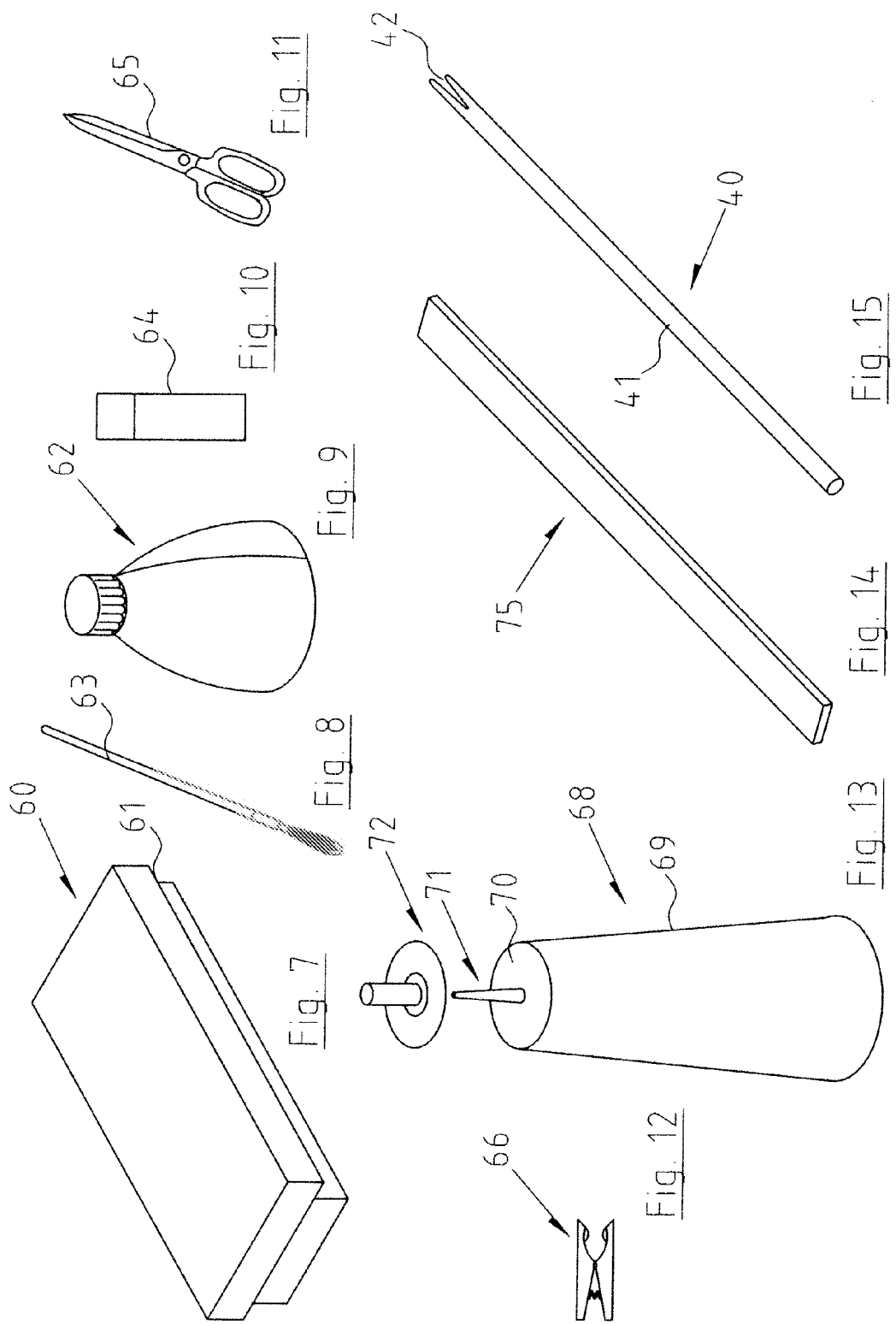

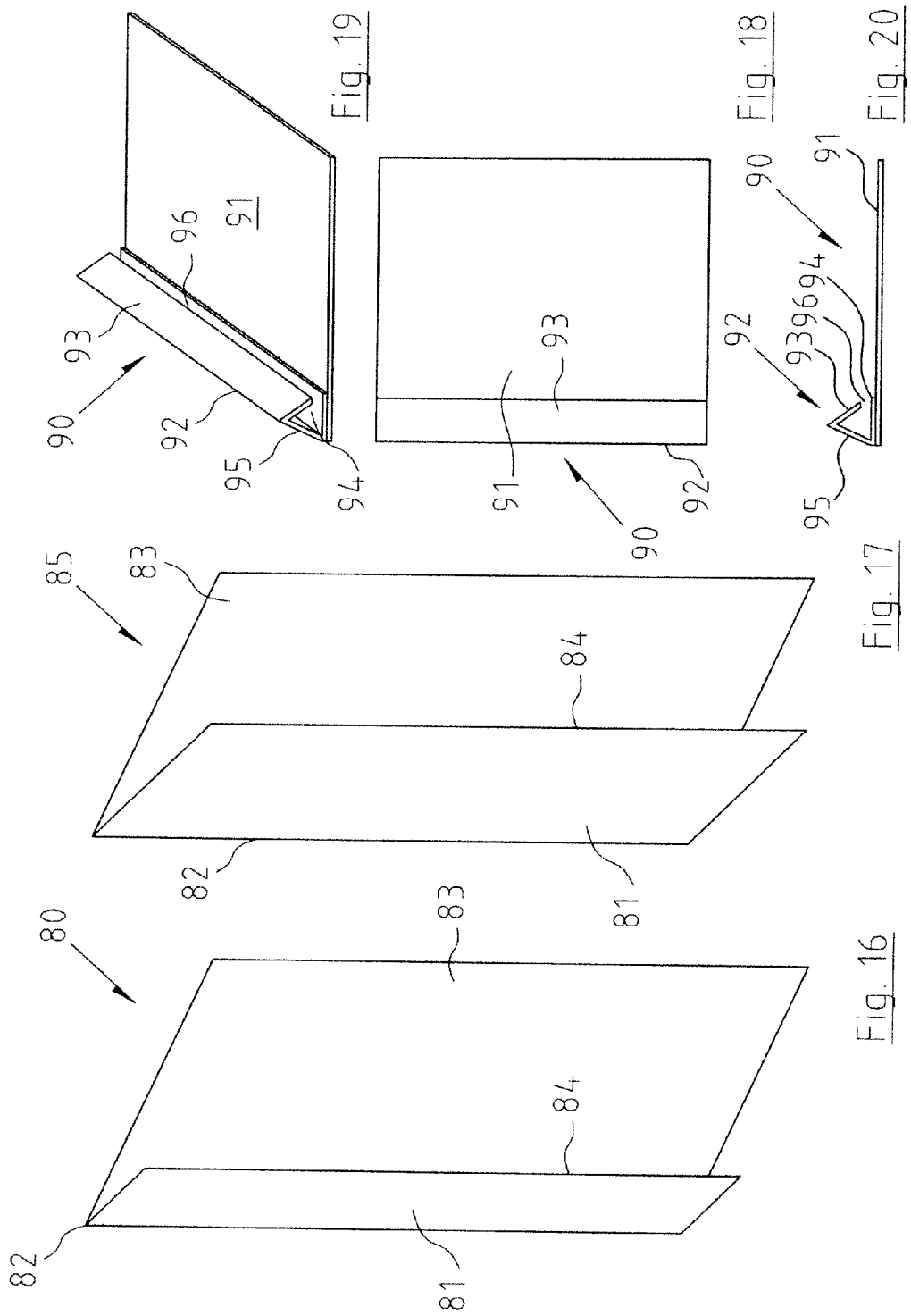

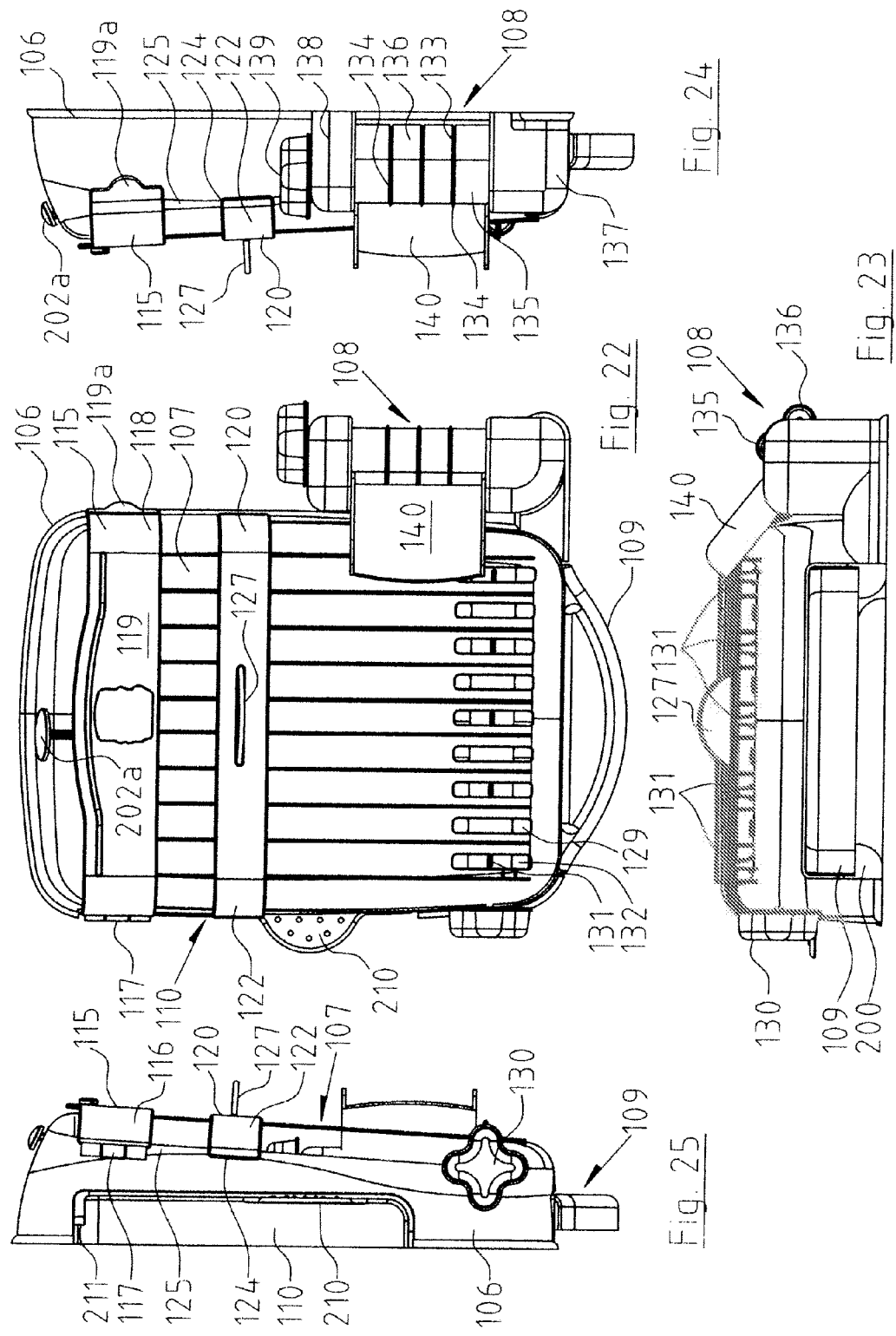

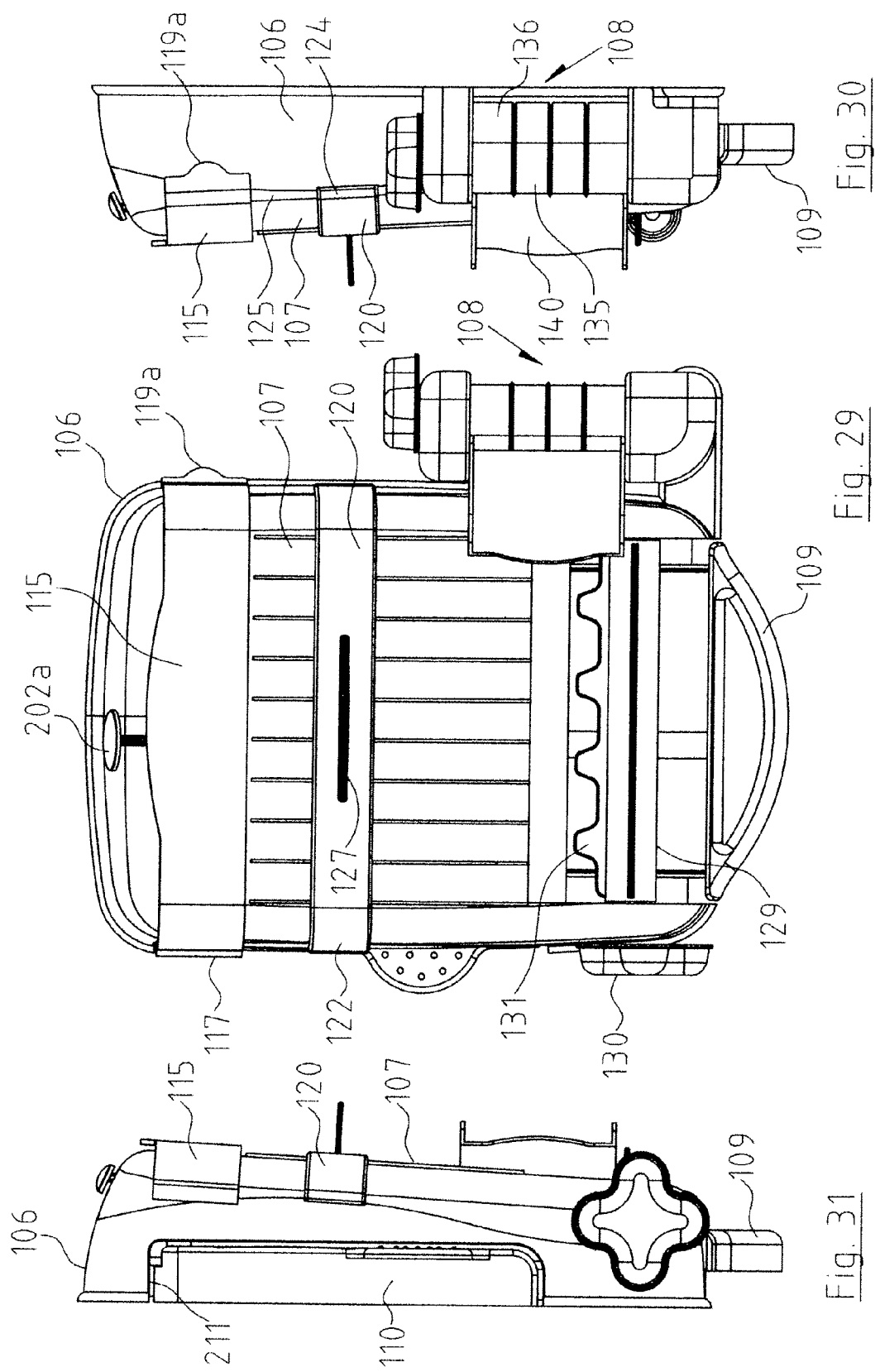

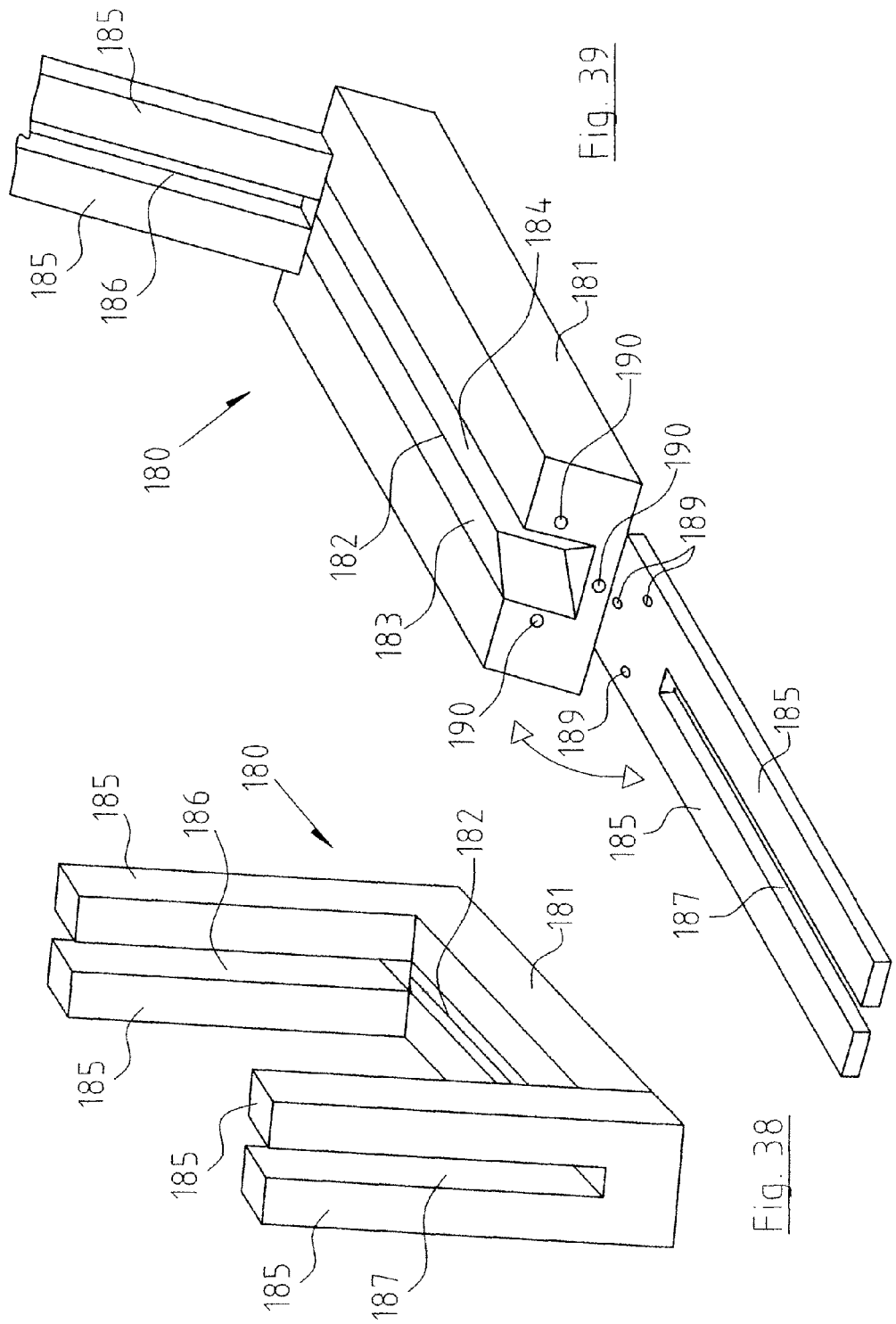

PAPER WEAVING KIT

RELATED APPLICATIONS

The subject application is a U.S. National Stage application that claims the priority of International Application No. PCT/IE2005/000125, filed on 07 Nov. 2005, which claims the priority of Irish National Application No.: S2004/0740, filed on 05 Nov. 2004.

This invention relates to weaving and in particular to the use of old newspapers and magazines for weaving decorative and utilitarian articles.

A considerable amount of waste is generated by old newspapers and magazines. It is an object of the present invention to facilitate re-use or recycling of this paper waste in a useful and enjoyable manner.

SUMMARY OF THE INVENTION

According to the invention there is provided a paper weaving kit including sheet tearing apparatus having means for tearing a strip of paper of a desired width from a sheet of paper, said strip for forming a paper weaving element, and a weaving aid having means for gripping and supporting a plurality of said paper weaving elements in parallel to form a set of warp weaving elements, said gripping means engageable with the paper weaving elements such that said paper weaving elements project outwardly therefrom for interweaving with associated weft weaving elements.

According to another embodiment of the invention there is provided gripping means mounted on a support panel which extends outwardly from the gripping means to support the weaving elements held by the gripping means.

According to one embodiment of the invention the gripping means is a clamp.

In one embodiment of the invention a surface of the support panel is subdivided into a number of juxtaposed lanes, each lane for reception of one of said paper weaving elements.

In another embodiment of the invention the surface of the support panel is subdivided by a plurality of spaced-apart parallel longitudinal ribs which project above the surface of the panel and extend outwardly from the gripping means to form the lanes, a lane for reception of a paper weaving element being formed between each adjacent pair of ribs.

In another embodiment of the invention the surface of the support panel is subdivided into lanes by indicia marked on the surface of the support panel.

In one embodiment of the invention lifting means is provided which is operable to lift every second weaving element in a row of juxtaposed weaving elements held by the gripping means.

In another embodiment of the invention the lifting means has a plurality of lifting arms mounted on a support and moveable between a lowered inoperative position below the support panel and a raised operative position above the support panel.

In one embodiment of the invention the lifting means comprises a rotatable spindle mounted adjacent the support panel spaced-apart from the clamp, said rotatable spindle being rotatably mounted on a spindle support, said rotatable spindle having drive means for rotation of the spindle on the spindle support, a number of spaced-apart lifting arms projecting radially outwardly from the spindle, each lifting arm being aligned with one of the lanes on the support panel and moveable by rotation of the spindle between the inoperative position below the support panel and the raised operative position extending above the support panel.

In another embodiment of the invention two sets of lifting arms are provided spaced-apart on the spindle, the lifting arms in each set of lifting arms being aligned with every second lane of the support panel and the lifting arms in a first set of lifting arms aligning with odd numbered lanes of the support panel and the lifting arms in a second set of lifting arms aligning with even numbered lanes of the support panel.

In another embodiment of the invention the lifting arms are moveable through associated slots in the support panel for movement between the operative and inoperative positions.

In a further embodiment of the invention the spindle is mounted adjacent an end of the support panel remote from the gripping means, said lifting arms being engageable with an underside of weaving elements which project outwardly of said end of the support panel.

In one embodiment of the invention the sheet tearing apparatus comprises a pair of elongate flaps hingedly connected together along one long edge, a free edge of one of said flaps forming a tearing edge, the width of said flap corresponding to the desired width of paper strip to be formed.

In another embodiment of the invention the sheet tearing apparatus comprises a base panel with at least one tear flap hingedly connected thereto for reception of a paper sheet therebetween.

In a further embodiment of the invention two tear flaps are hingedly mounted at opposite sides of the base panel, said tear flaps being of different width.

In a still further embodiment of the invention a clip is mounted on the base panel for engaging and holding an inner edge of a sheet mounted between the base panel and the tear flap, a slot being provided in the tear flap to receive the clip when the tear flap is folded against the base panel.

In one embodiment of the invention there is provided a fold indicator apparatus operable for marking fold lines on a paper strip to facilitate folding said paper strip to form the paper weaving element.

In another embodiment of the invention the fold indicator apparatus comprises a crimping device for crimping fold lines in the paper strip.

In a further embodiment of the invention the crimping device has a pair of rotatable rollers for reception and through passage of the paper strip between the rollers, said rollers being rotatably mounted on a roller support, drive means for rotation of the rollers on the roller support, one or more circumferential ribs projecting outwardly of a first roller of said rollers, a complementary circumferential groove associated with each rib being provided in a second roller of said rollers.

In a still further embodiment a feed chute is provided for delivering a paper strip between the rollers.

In one embodiment the feed chute has guide means for delivering the paper strip in a desired orientation to the rollers.

In another embodiment the chute comprises a flat slide panel with upstanding flanges at each side of the slide panel which form the guide means.

In a further embodiment there is provided a housing incorporating the weaving aid and on which the sheet tearing apparatus is mounted.

In one embodiment the sheet tearing apparatus is slidably mounted in an associated socket on the housing.

In another embodiment the crimping device is mounted on the housing.

In a further embodiment the crimping device is attached to the housing by a swivel mount which allows movement of the crimping device between a stored position against the housing and an outwardly extended in-use position.

In a still further embodiment a storage drawer is mounted on the housing.

In one embodiment the housing has a top forming the weaving aid with a downwardly depending side wall within which are housed the sheet tearing apparatus and the storage drawer beneath the weaving aid.

In another embodiment the spindle of the lifting means is rotatably mounted between opposite sides of the side wall.

In a further embodiment there is provided an elongate shaper strip about which the paper strip can be wrapped to form a weaving element of a desired width.

In one embodiment the kit includes an elongate paper rolling rod having a paper gripping notch at one end.

In a further embodiment the kit includes a former having a body in a desired shape about which weaving elements can be woven to create an article of said desired shape.

In another embodiment the invention provides apparatus for forming the weaving strips, said apparatus including a sheet tearing apparatus having a pair of elongate flaps hingedly connected together along one long edge, each flap being of a width corresponding to the desired width of paper strip to be formed. In another arrangement the flaps could be of different size.

In another embodiment a window is provided in at least one of said flaps and means is provided for aligning an edge of a paper sheet at a selected position in said window.

In another embodiment a pair of spaced-apart windows are provided.

In another embodiment the apparatus further includes a paper rolling rod comprising an elongate rod having means for gripping an edge of a strip at one end. Conveniently said gripping means may comprise a notch at the end of the rod.

In another embodiment the apparatus further includes a weaving aid having means for clamping a plurality of juxtaposed strips edge to edge in a row.

Preferably the weaving aid has a bottom panel and a top panel hingedly mounted at one edge on the bottom panel, the panels being movable between a closed position for clamping edges of wearing strips between the panels at said hinge edge and an open position.

In another embodiment the apparatus includes a former in the desired shape of an object to be woven, such as a cup, basket or the like, said former having means for releasably securing weaving elements on the former for holding said weaving elements in desired weaving positions on the former.

In another embodiment there is provided a paper weaving kit including means for cutting paper sheets into strips of a desired size for forming the paper weaving elements. The kit may also include means for forming the paper strips into elongate weaving elements. Preferably also the kit will include weaving aids to aid weaving a number of weaving elements together into desired objects, panels and the like.

In another aspect of the invention there is provided a method of weaving which includes forming strips of paper into weaving elements. The method particularly relates to the use of used newspapers, magazines and the like to form the weaving elements and in this regard the method includes cutting newspaper sheets into strips and forming the weaving elements from said strips.

In another embodiment of the invention the method includes forming elongate flat weaving elements by folding the cut strips.

In another embodiment the method includes winding each strip of paper about a cylindrical former, removing the tubular wound strip from the former and flattening the tubular wound strip to form a weaving element.

In an alternative arrangement the method includes forming elongate weaving elements by engaging the cut strips with a thin elongate former and winding the strips spirally about the elongate former.

In another embodiment the method includes the step of applying a protection coating exterior to the weaving strips. Said coating may comprise a varnish or the like to provide added protection, strength, wear resistance and/or render the strips water resistant or waterproof.

BRIEF DESCRIPTION OF THE DRAWINGS

The invention will be more clearly understood by the following description of some embodiments thereof given by way of example only, with reference to the accompanying drawings, in which:

FIG. 2 is a perspective view of another sheet tearing apparatus according to the invention;

FIG. 3 is an elevational view of the sheet tearing apparatus shown in FIG. 2;

FIG. 7 is a perspective view of a weaving kit according to the invention;

FIGS. 8 to 15 show various elements of the weaving kit of FIG. 7;

FIGS. 16 and 17 show two sheet tearing apparatus forming portion of the kit;

FIG. 18 is a plan view of a weaving aid forming portion of the kit;

FIG. 19 is a perspective view of the weaving aid of FIG. 18;

FIG. 20 is an end elevational view of the weaving aid shown in FIG. 18;

FIG. 22 is a plan view of the weaving kit of FIG. 21;

FIG. 23 is an end elevational view of the weaving kit of FIG. 21;

FIG. 24 is a side elevational view of the weaving kit of FIG. 21;

FIG. 25 is another side elevational view of the weaving kit shown in FIG. 21 taken from the opposite side to that shown in FIG. 24;

FIG. 29 is a plan view of the weaving kit shown in FIG. 28;

FIG. 30 is a right side elevational view of the weaving kit shown in FIG. 28;

FIG. 31 is a left side elevational view of the weaving kit shown in FIG. 28;

FIG. 38 is a perspective view of a weaving aid;
FIG. 39 is a detail perspective view of the weaving aid shown in FIG. 38 shown in another position of use.

DETAILED DESCRIPTION OF PREFERRED EMBODIMENTS

Figure 4:
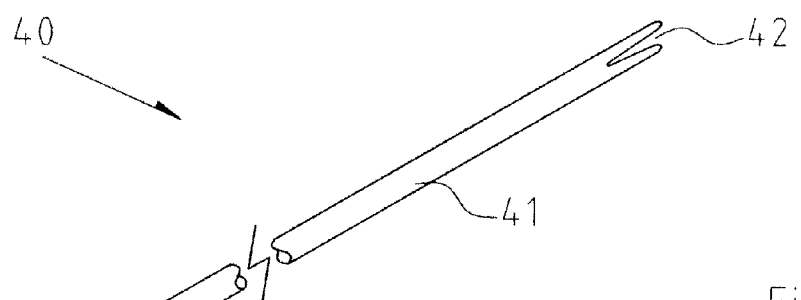
FIG. 4 is a perspective view of a strip rolling rod.

Referring to the drawings, some of or all of the apparatus shown in FIGS. 1 to 5 may be provided in a kit for use by a weaver to form weaving elements from old newspapers or magazines.

Figure 1:
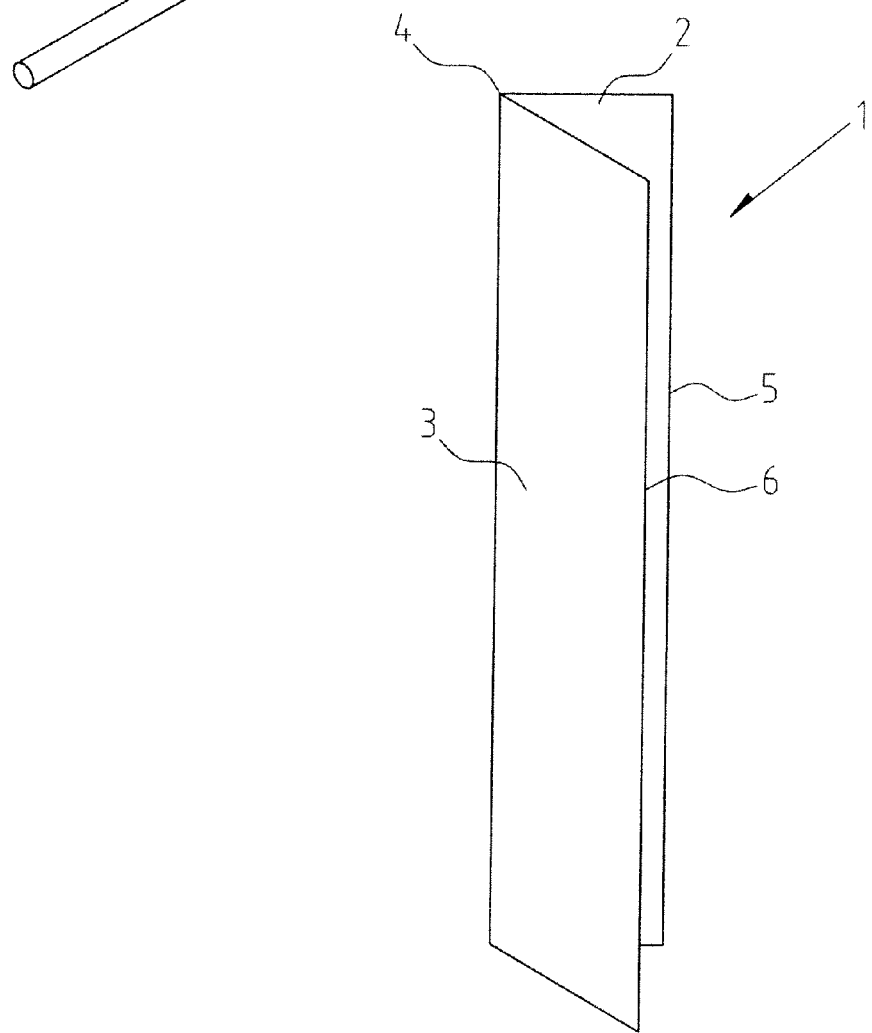
FIG. 1 is a perspective view of a sheet tearing apparatus according to the invention.

Referring initially to FIG. 1 there is shown a newspaper sheet tearing apparatus indicated generally by the reference numeral 1 comprising a pair of elongate flaps 2, 3 hingedly connected by a hinge 4 along one long edge of the flaps 2, 3. It will be noted that each flap 2, 3 is of a width corresponding to the desired width of paper strip to be torn away from a used sheet of newspaper.

In use, an edge of the used newspaper sheet is inserted between the flaps 2, 3 which are hinged closed to clamp the edge of the sheet therebetween. The remainder of the sheet can then be torn along free edges 5, 6 of the flaps leaving a strip between the flaps 2, 3. Upon opening the flaps 2, 3 the strip is removed and is then in the sequence shown in FIG. 6 folded inwardly from each long edge towards the centre and then two halves about the centre line are folded over each other. If desired a number of additional inward folds may be executed to provide an elongate folded paper strip weaving element 50.

Referring now to FIGS. 2 and 3 there is illustrated another sheet tearing apparatus indicated generally by the reference numeral 10. The sheet tearing apparatus 10 comprises a pair of flaps 11, 12 hingedly connected by a hinge 13 along one long edge. The flaps 11, 12 are foldable by means of the hinge 13 between an overlapping position clamping a newspaper portion therebetween and an open position. A pair of spaced-apart windows 14 are provided in the front flap 12. Paper alignment indicating lines 15, 16, 17 are provided on the front face of the flap 12, extensions of said lines 15, 16, 17 passing through the centres of the circular windows 14. Slots 20, 21 extend inwardly from a top edge 22 and a bottom edge 23 of the front flap 12. An inside edge 24, 25 of each slot 20, 21 is in alignment with the lines 15, 16, 17. A pair of V-shaped notches 26, 27 are provided on the rear flap 11 pointing inwardly from the top edge 28 and bottom edge 29 of the rear flap 11. An inner point of each V-notch 26, 27 aligns with the inside edge 24, 25 of the slots 20, 21 as shown in FIG. 3.

In use, with the flaps 11, 12 open an edge of a newspaper sheet can be inserted between the flaps 11, 12 which are then closed to clamp the newspaper sheet therebetween. The newspaper sheet can then be torn along the free edges 30, 31 of the flaps 11, 12. The edge of the newspaper can be pushed right into the hinge 13 or alternatively the edge can be aligned with the lines 15, 16, 17 using the windows 14 in the front flap 12. Again, when a paper strip of a desired width has been formed the strip can be folded about a longitudinal axis a number of times to provide a layered elongate paper strip weaving element.

Referring now to FIG. 4 there is shown a paper rolling rod indicated generally by the reference numeral 40. The rod 40 comprises an elongate rod 41 with a paper engaging notch 42 at one end.

In use, one end of a paper strip, formed by the tearing apparatus 1 for example, is inserted into the notch 42 and the paper strip is then wound in spiral fashion about the rod 41. When fully wound it is disengaged from the notch 42 and can then be flattened to form an elongate paper weaving element.

Figure 5:
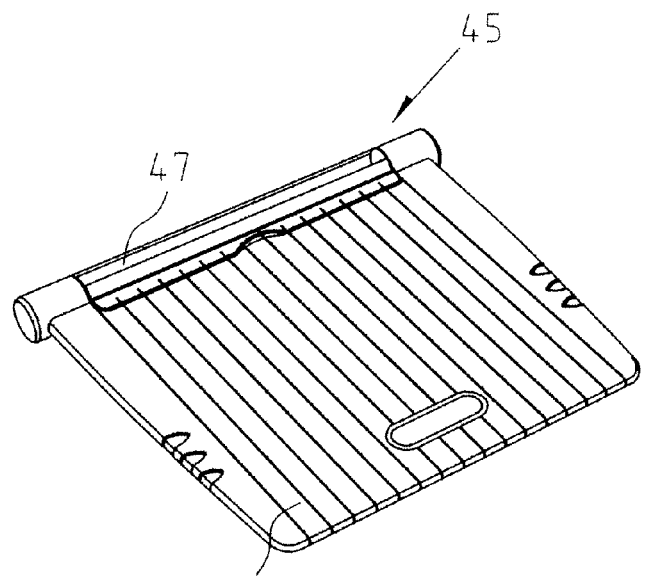
FIG. 5 is a perspective view of a weaving aid forming portion of the apparatus of the invention.

Referring now to FIG. 5 there is shown a weaving aid indicated generally by the reference numeral 45. The weaving aid 45 essentially comprises a support panel 46 with a spring loaded clamp plate 47 at one end. A plurality of the weaving elements can be mounted side by side on the panel 46 with an inner end of each weaving element clamped under the clamp plate 47. These then form a set of juxtaposed warp weaving elements on the panel 46. Then further weft weaving elements can be woven through the clamped warp weaving elements over and under across the row of clamped warp weaving elements to form a woven panel. A set of parallel spaced-apart lines, grooves or ribs 48 are provided on the panel 46 for aligning a number of weaving elements side by side on the panel 46.

Figure 6:
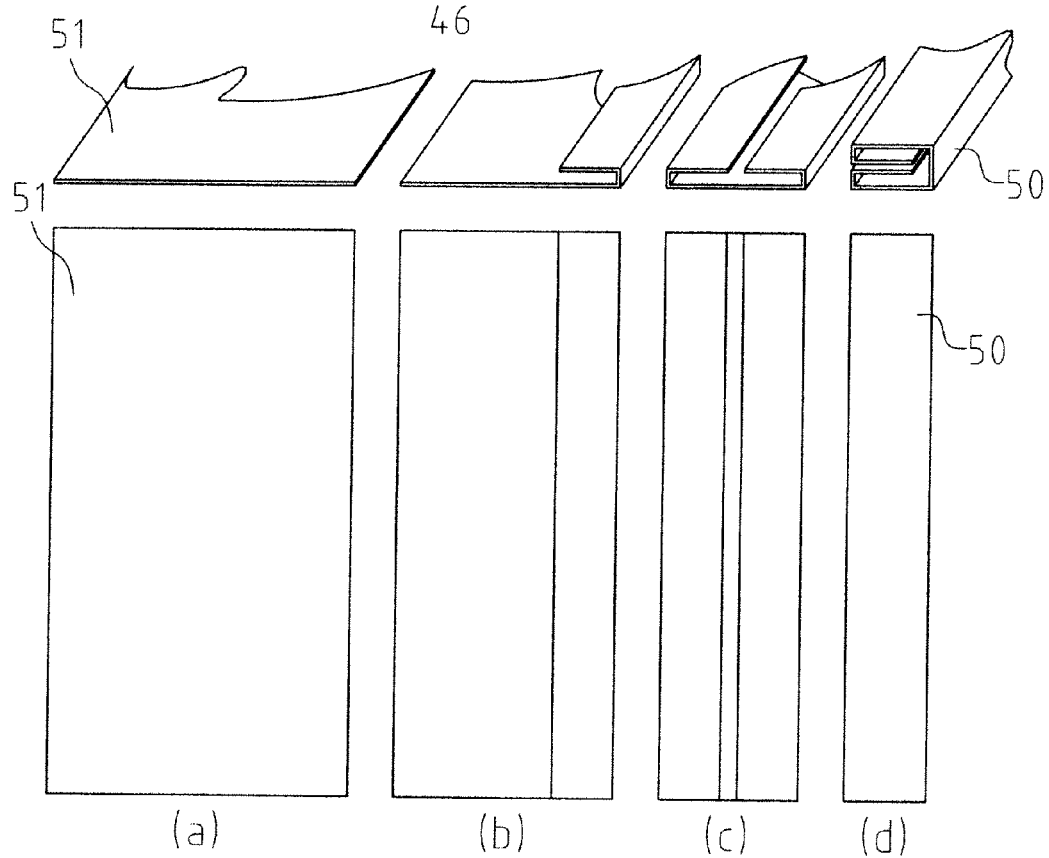
FIG. 6 illustrates sequential steps in forming an elongate paper weaving element.
Figure 21:
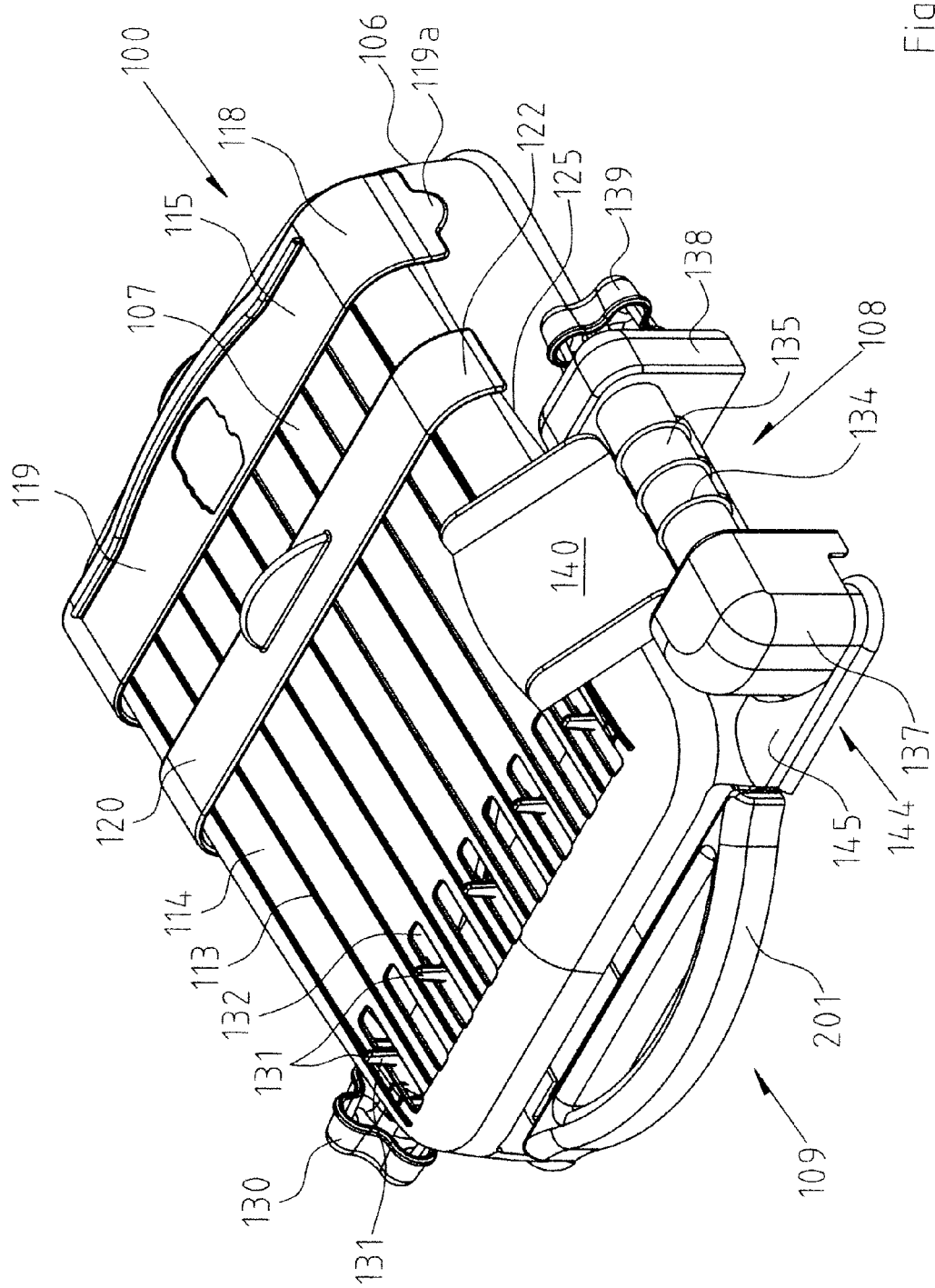
FIG. 21 is a perspective view of a weaving kit according to another embodiment of the invention.

FIG. 6 shows the folding of a paper strip 51 formed by the tearing apparatus of FIG. 1 in stages to form an elongate paper weaving element 50 with four layers of paper. On the final fold the mating edges of the paper are glued together by adhesive or double sided adhesive tape so that the folded weaving element 50 will hold its shape.

It will be appreciated that many different decorative and utilitarian articles can be woven using the elongate weaving elements 50. Articles such as bowls, baskets, bags, shoes, panels, etc. can be woven.

The invention provides a useful method and apparatus for using waste paper. The various apparatus described may be provided in a kit form or may be provided separately as desired.

For forming handles and the like a sheet of used newspaper can be crumpled together about a longitudinal axis to form weaving elements and then several of these weaving elements can then be plaited together.

Exteriors of the articles produced may be coated with a varnish or the like to provide sealing, protection and improved wear resistance.

Referring now to FIGS. 7 to 20 there is illustrated a paper weaving kit according to the invention indicated generally by the reference numeral 60. Parts similar to those described previously are assigned the same reference numerals. The kit 60 comprises a storage box 61 containing a number of pieces of apparatus which aid in weaving objects from wastepaper. The apparatus may include a bottle 62 of liquid adhesive and an associated brush 63 for application of the adhesive. In addition, or alternatively an adhesive stick 64 is provided. Also shown are a scissors 65 and a clamp peg 66 a number of which would normally be provided in the kit 60. A former 68 for forming a cup or the like object is provided. This may conveniently be manufactured from plastics material and has a frusto-conical body 69 with a circular flat top 70. A spike 71 projects upwardly at a centre of the top 70 for engagement by a complementary clamping element 72. In use, a number of paper weaving elements can be clamped between the clamping element 72 and the top 70 and then shaped around an exterior of the body 69 of the former 68 to aid in weaving the cup shape.

FIG. 14 shows a shaper strip 75. This is essentially an elongate rectangular element about which a strip of paper can be wound to form weaving elements of a desired width corresponding to the width of the shaper strip 75. A number of shaper strips in different sizes may be provided.

FIG. 15 shows a paper rolling rod 40 of the type described previously.

FIG. 16 shows a newspaper sheet tearing apparatus 80 having flaps of different size namely a small outer flap 81 for tearing a paper strip away from a newspaper sheet to a desired width corresponding to the width of the flap 81. An inner end of the flap 81 is connected by a hinge 82 to a larger rear flap 83 which provides additional support for a newspaper sheet when feeding it between the flaps 81, 83 for clamping therebetween before tearing the newspaper sheet along a free edge 84 of the outer flap 81.

FIG. 17 shows another newspaper sheet tearing apparatus 85. In this case a wider outer flap 81 is provided for forming a paper strip of increased width.

Referring now to FIGS. 18 to 20 a weaving aid 90 forming portion of the kit 60 is shown. The weaving aid 90 has a rectangular base support panel 91. A plastics clamping element 92 is mounted along one side edge of the panel 91. The clamping element 92 has a C-shape having a pair of clamp arms 93, 94 which are interconnected by an inner wall 95, the arms 93, 94 tapering inwardly from opposite sides of the wall 95. A number of warp weaving elements 50 can be inserted through an opening 96 between outer free ends of the arms 93, 94 which clamp the warp weaving elements 50 which lie across the panel 91 to aid in weaving. When the warp weaving elements 50 lie across the panel 91 additional weft weaving elements 50 can be woven over and under successive clamped warp weaving elements 50 to form a woven panel on the weaving aid 90.

Referring now to FIGS. 21 to 27 there is shown another paper weaving kit indicated generally by the reference numeral 100. The kit 100 has a box like housing or body 106. A top of the body 106 forms a weaving aid indicated generally by the reference numeral 107. Crimping apparatus, 108 is mounted at one side of the body 106. A removable sheet tearing apparatus 109 is slidably mounted within the body 106 at a front end of the body 106. A storage drawer 110 is also mounted within the body 106 at one side of the body 106.

The weaving aid 107 comprises a support panel 112. A number of parallel longitudinal upstanding ribs 113 on the panel 112 subdivide the panel into a number of channels or lanes 114, each for reception of a weaving element. A fixed clamp 115 is mounted at a rear end of the body 106. The fixed clamp 115 is c-shaped having a central band 119 and a curved inner end 116 mounted by a hinge 117 at one side of the body 106. A curved outer end 118 of the fixed clamp 115 is adapted for snap engagement with an associated locking groove 125 on a side of the body 106. A finger grip tab 119a is provided at the free outer end 118. The curved ends 116, 118 follow the curved contour of upper side edges of the body 106. The clamp 115 hinges upwardly away from the panel 112 in a plane perpendicular thereto.

A moveable clamp 120 is also adapted for releasable snap engagement with a top of the body 106. The moveable clamp 120 has a C-shaped body having a central band 121 which extends across the panel 112. Curved end pieces 122 curve around upper side edges of the body 106. Each of these end pieces 122 has an inwardly extending lug 124 at an outer free end for snap engagement with a locking groove 125 extending along each side 126 of the body 106. Thus it will be appreciated that the moveable clamp 120 can be positioned at any location along the panel 112. An upwardly projecting hand grip 127 is mounted on the central band 121.

Figure 26:
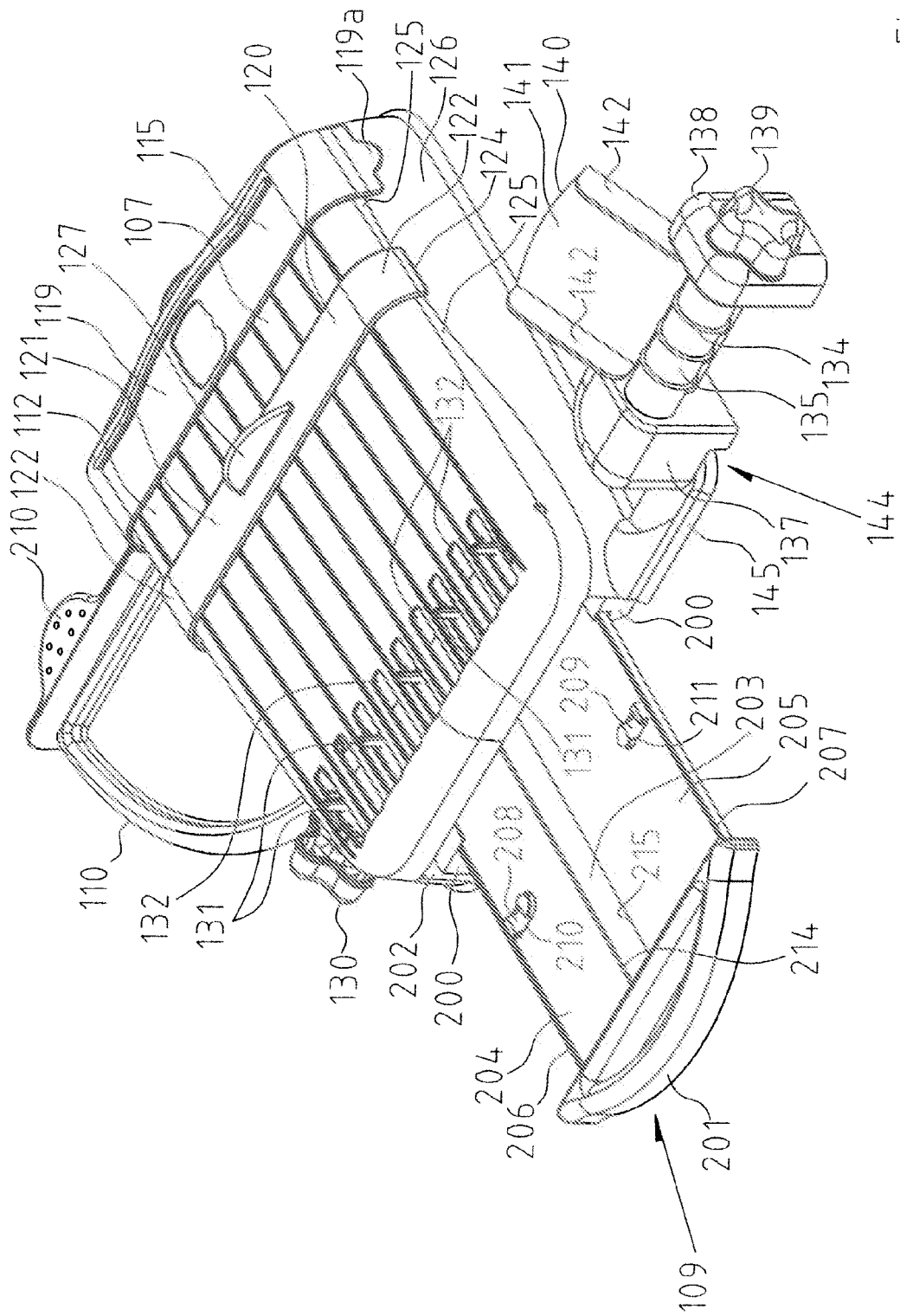
FIG. 26 is a perspective view of the weaving kit of FIG. 21, shown in an open in-use position.
Figure 27:
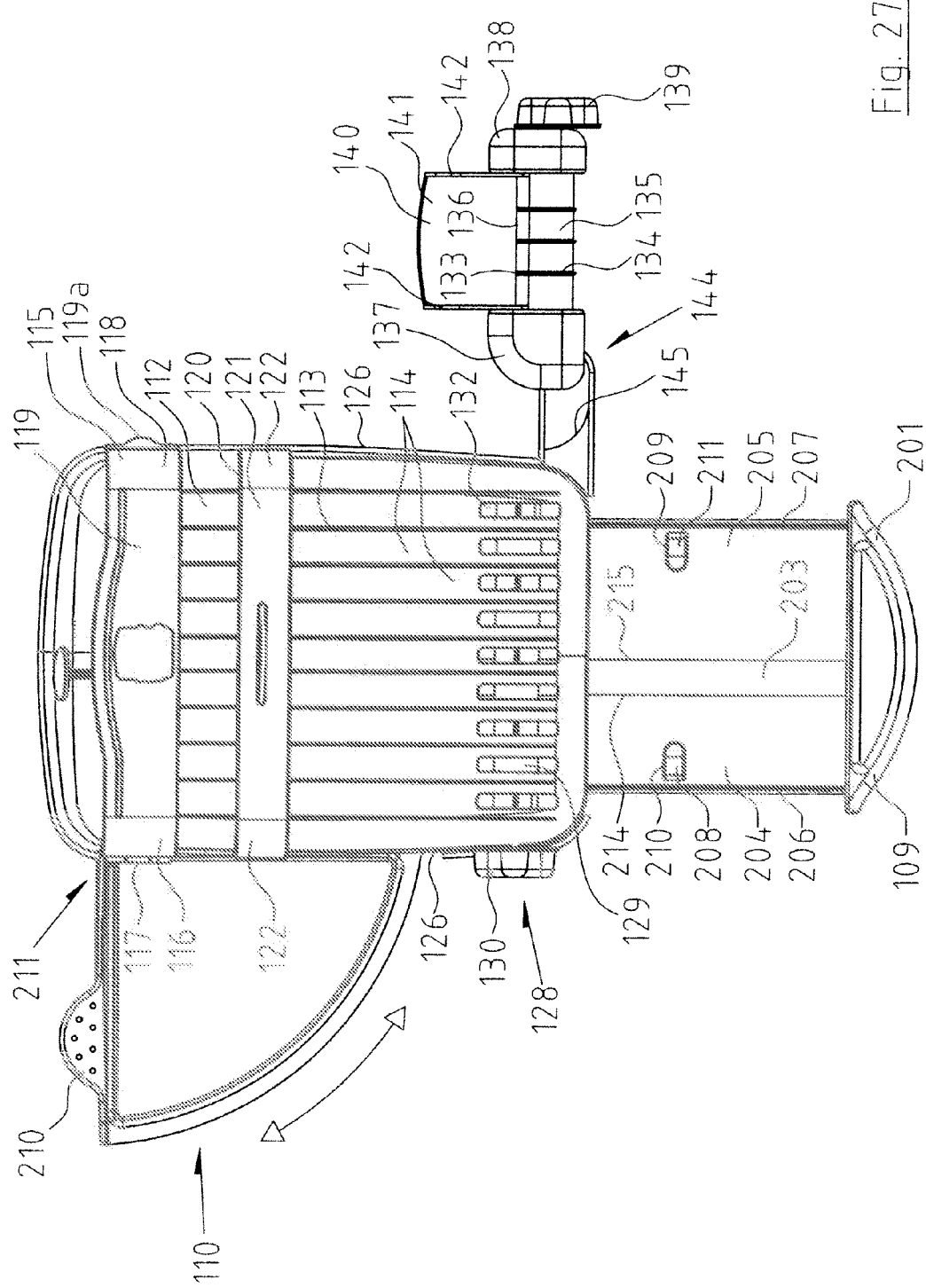
FIG. 27 is a plan view of the weaving kit portion corresponding to the position shown in FIG. 26.
Figure 28:
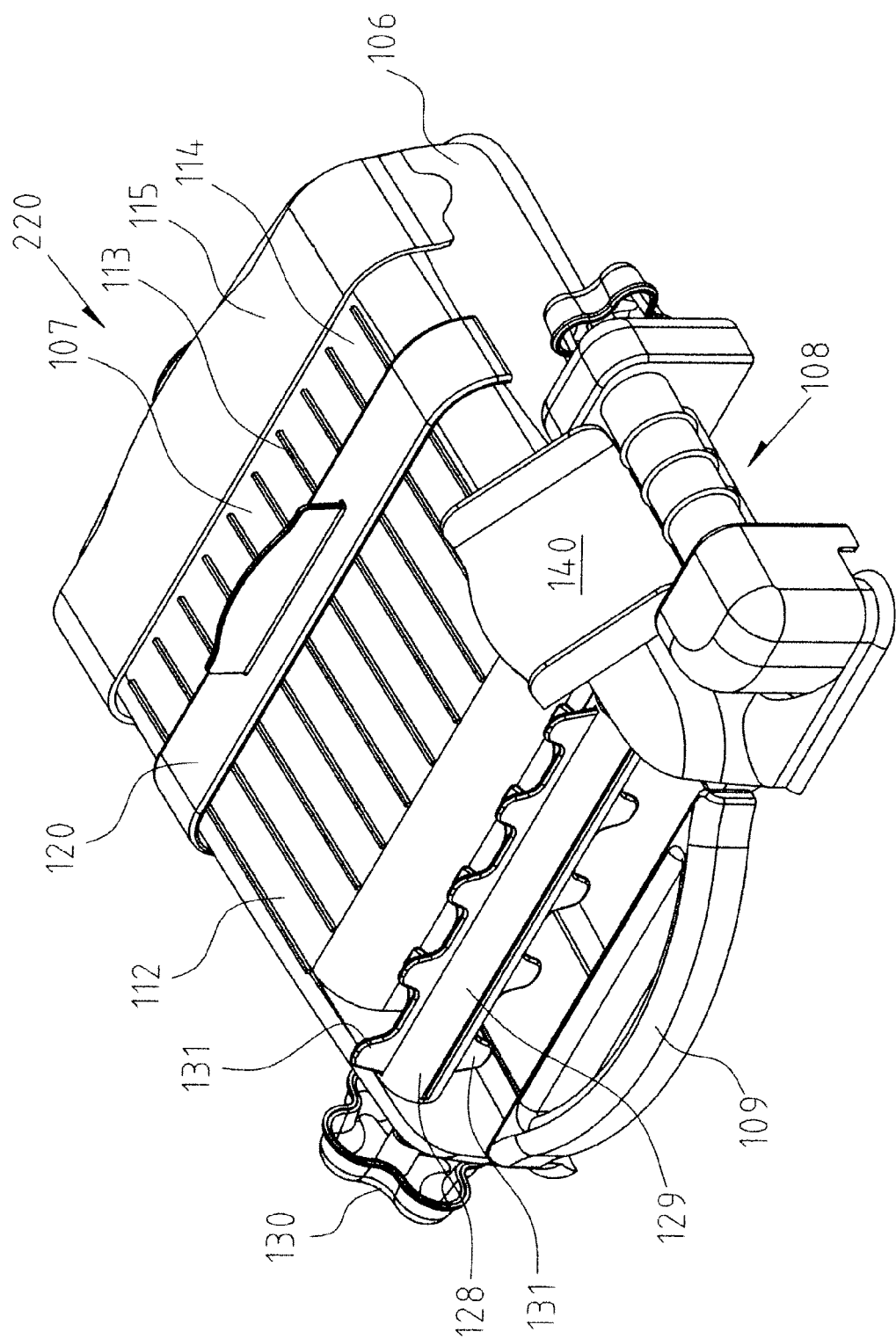
FIG. 28 is a perspective view of another weaving kit.

At a front end of the body 106 a lifting mechanism 128 is provided forming portion of the weaving aid 107. The lifting mechanism 128 has a rotatable spindle 129 which is rotatably mounted within the body 106, being mounted between opposite side walls 126 of the body 106. A hand wheel 130 at one end of the spindle 129 which projects through the side wall 126 is manually operable to rotate the spindle 129. A number of spaced-apart lifting arms 131 project radially outwardly from the spindle 129 and are moveable through complementary slots 132 provided in each lane 114 of the panel 112 indirectly above the spindle 129. It will be noted that these lifting arms 131 are arranged in rows of lifting arms 131 which project outwardly through every second slot 132 and thus will lift every second warp weaving element mounted in the lanes 114 of the panel 112. Thus as can be seen in FIG. 26 a lifting arm 131 projects upwardly of each second lane 114 of the panel 112 of the weaving aid 107. By rotating the spindle 129 the currently exposed lifting arms 131 will be moved beneath the panel 112 and another set of lifting arms 131 will emerge through the slots 130 in the other alternate lanes 114.

The crimping apparatus 108 has a pair of crimping rollers 135, 136 rotatably mounted between a pair of end supports 137, 138. An outwardly projecting hand wheel 139 on the outer end support 138 is operable for manual rotation of the rollers 135, 136. Three spaced-apart circumferential ribs 134 in a first roller 135 cooperate with three complementary circumferential grooves 133 in the second roller 136. A feed chute 140 delivers a sheet of paper between-the rollers 135, 136 and has a slide panel 141 with upstanding side flanges 142 to guide the paper sheet squarely through the rollers 135, 136. An inner end support 137 of the crimping apparatus 108 is mounted by a swivel mount 144 on a laterally projecting flange 145 at a front end of the body 106. Thus the crimping apparatus 108 can be swivelled between a stored position against the side wall 126 of the body 106 (FIG. 21) and an outwardly extending in-use position (FIG. 26).

The sheet tearing apparatus 109 is mounted by slide rails 200 within the body 106. A handle 201 is provided at an outer end to grip and slide the sheet tearing apparatus 109 in and out of an associated receiver socket 202 in the body 106 beneath the panel 112. A locking mechanism 202a releasably secures the sheet tearing apparatus 109 within the body 106 and when released allows removal of the sheet tearing apparatus 109 from the body 106 for use. The sheet tearing apparatus 109 has a base panel 203. Tear flaps 204, 205 are mounted by hinges 206, 207 at each side of the base panel 203. Spring clips 208, 209 mounted on the base panel 203 adjacent side edges of the base panel 203 project upwardly through associated openings 210, 211 in the tear flaps 204, 205. The tear flaps are different widths to provide paper strips of different widths for forming weaving elements 50.

The storage drawer 110 has a finger grip 210 and is mounted by a hinge 211 on the body 106 so that it pivots about a vertical axis for swivelling into and out of the body 106 at one side of the body 106.

In use, the sheet tearing apparatus 109 is removed from the body 206. A sheet of newspaper, magazine or the like is inserted between one of the flaps 204, 205 and the base panel 203, depending on the width of strip to be torn off, and is gripped by the clip 208, 209. With the flap 204, 205 held closed the paper can be torn along an inner edge 214, 215 of the flap 204, 205 to leave a strip of the required width. The flap 204, 205 is opened and this paper strip is then removed from the clip 208, 209.

With the crimping apparatus 108 in the outward in-use position as shown in FIG. 26 the paper strip is fed down the chute 140 between the rollers 135, 136. The three spaced-apart circumferential ribs 134 and grooves 133 on the rollers 135, 136 cooperate to crimp three longitudinal parallel fold lines into the paper strip. The paper strip can then be folded about the crimped lines as previously described to form a weaving element 50. Thus a plurality of the weaving elements 50 are formed.

A number of the weaving elements 50 are then mounted on the weaving aid 107. With the moveable clamp 120 removed and the fixed clamp 115 in an open position a number of the weaving elements 50 are mounted on the weaving aid 107, forming warp weaving elements 50, one weaving element 50 being mounted in each of the lanes 114 of the panel 112. The fixed clamp 115 is then swivelled shut to clamp inner ends of the warp weaving elements 50 on the panel 112. By turning the hand wheel 128 the lifting arms 131 of the lifting mechanism 128 raise a bottom end of every second warp weaving element 50 above the panel 112. A weft weaving element 50 can then be fed between the raised and lowered warp weaving elements 50. Upon further turning the hand wheel 130 the raised warp weaving elements 50 are lowered and their next adjacent warp weaving elements 50 are raised and a second weft weaving element 50 is then fed between the raised and lowered warp weaving elements 50 on the panel 112. This process is continued alternating the raising and lowering of every second warp weaving element 50 and inserting weft weaving elements 50 therebetween to form a woven panel on the weaving aid 107. When several rows have been woven the moveable clamp 120 can be used to keep the woven portion securely against the panel 112 as the free ends of the warp weaving elements 50 are raised and lowered by the lifting mechanism 128. Woven panels of greater length than the panel 112 can be formed by releasing the clamps 115, 120 and moving the woven portion of the woven panel through the fixed clamp 115 before reengaging the fixed clamp 115 and then continuing weaving as before.

Referring now to FIGS. 28 to 35 there is shown another weaving kit indicated generally by the reference numeral 220. This weaving kit 220 is largely similar to the weaving kit shown in FIG. 21 and like parts are assigned the same reference numerals. In this case however the panel 112 of the weaving aid 107 is somewhat shortened and the lifting mechanism 128 is exposed.

Figure 36:
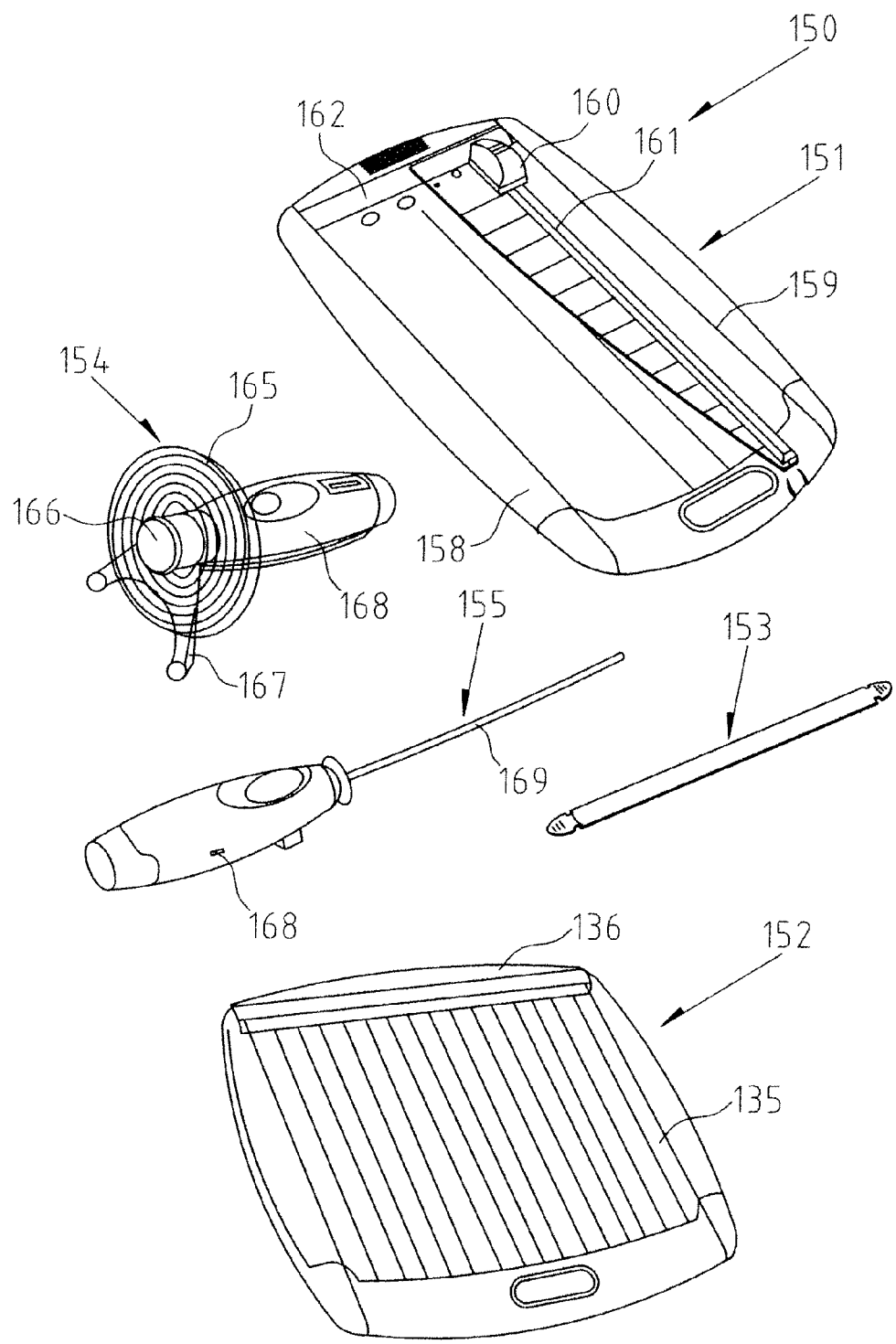
FIG. 36 is a perspective view of a further weaving kit.

Referring now to FIG. 36 there is shown another weaving kit indicated generally by the reference numeral 150. The kit 150 includes a sheet cutter 151, a weaving aid 152, an element former 153, a winder 154 and a motorised winding rod 155.

The cutter apparatus 151 has a base support 158 with an upstanding wall 159 at one side. A cutter 160 is slidably mounted on a cutter rail 161 which is parallel to the wall 159. An inner end of the cutter rail 161 is slidably mounted on a rod 162 for moving the cutter rail 161 towards or away from the wall 159 to adjust the spacing between the wall 159 and the cutter 160. A paper sheet is mounted on the base 158 with a leading edge abutting the wall 159. The rail 161 is then adjusted so that it is positioned a desired distance from the wall 159. The cutter 160 is then drawn along the rail 161 to part a leading edge of the sheet away forming the paper strip which can then be formed into the weaving element 50 as previously described. To assist in this the paper strip can be wound about the former 153 which is then removed from the centre of the wound strip.

The winder 154 includes a disc 165 with a paper gripper 166. The disc 165 is rotatably mounted on a support frame 167 and is engaged by a removable motor 168 which is operable for rotation of the disc 165 to wind up a paper weaving element about the gripper 166 to form a circular panel. The motor 168 together with the frame 167 forms a tripod for rotatably supporting the disc 165.

The motor 168 can be disengaged from the disc 165 and a winding rod 169 engaged with the motor drive such that the motor 168 is operable to rotate the rod 169 axially. Thus a paper strip can be wound in spiral fashion about the rod 169.

The weaving aid 152 is essentially similar to the weaving aids described previously and like parts are assigned the same reference numerals.

Figure 37:
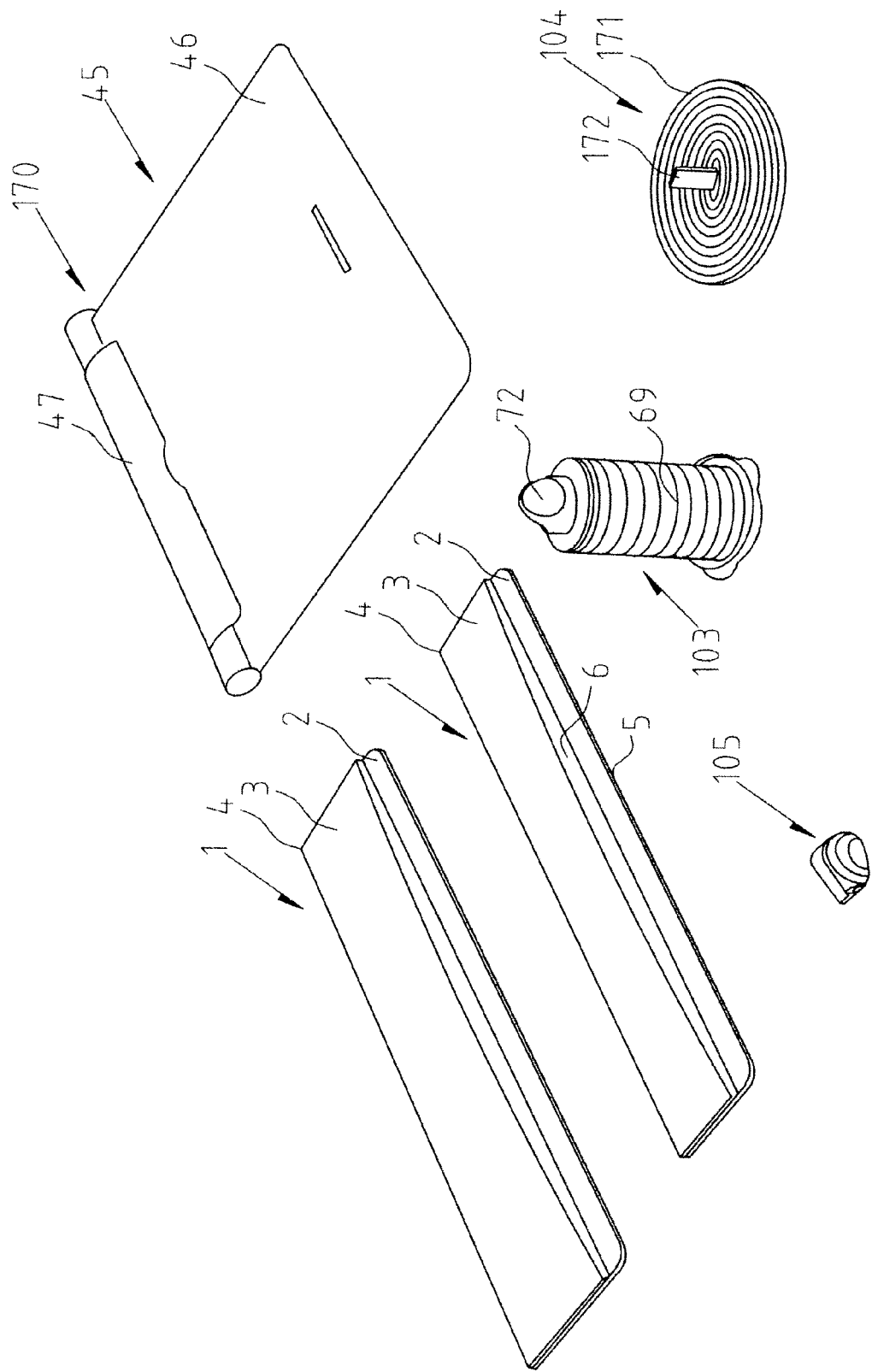
FIG. 37 is a perspective view of a still further weaving kit.

Referring now to FIG. 37 there is illustrated another weaving kit indicated generally by the reference numeral 170. Parts similar to those described previously are assigned the same reference numerals. These include the weaving aid 45, a former 103, a manual winder 104, a double sided adhesive tape dispenser 105 and sheet tearing apparatus 1. In this case a sheet tearing apparatus 1 of different sizes is provided. Also it will be noted that uppermost flap 3 is shorter than the lowermost flap 2. A free edge 6 of the uppermost flap 3 has an upstanding flange and this provides a tear edge along which a newspaper sheet inserted between the flaps 2, 3 is torn to form a paper strip of the desired width, which corresponds to the width of the upper flap 3. The winder 104 has a circular body 171 with an upstanding central lug 72 about which a weaving element is wound to form a circular base for a cup, vase or the like article.

Figure 33:
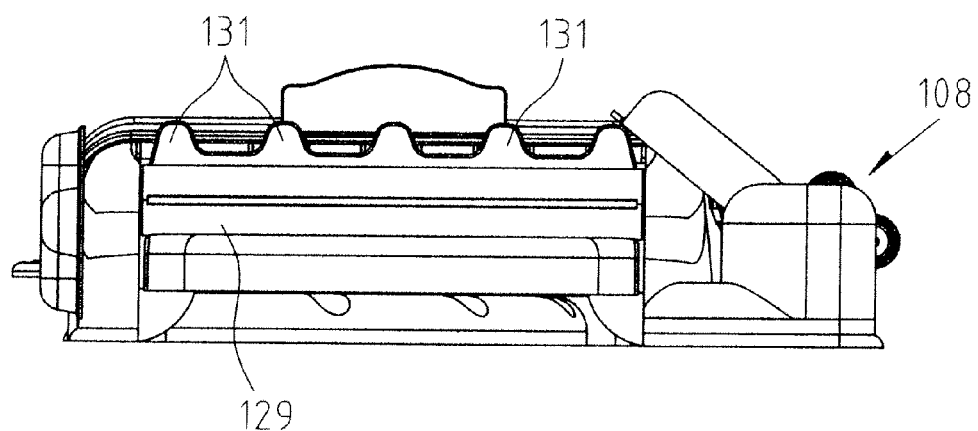
FIG. 33 is a front end elevational view of the weaving kit shown in FIG. 28.
Figure 34:
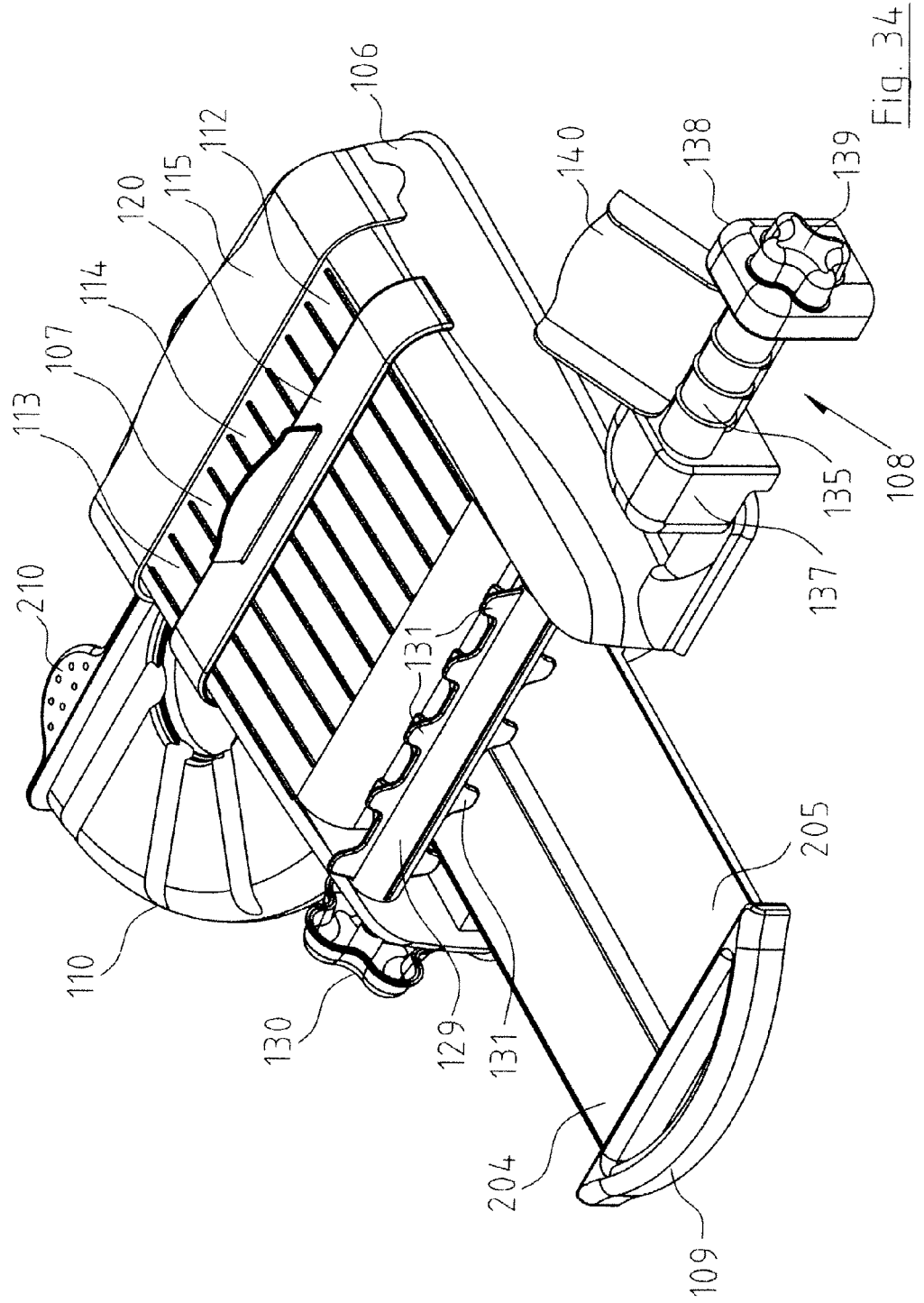
FIG. 34 is a perspective view of the weaving kit shown in FIG. 28, showing the weaving kit in an open in-use position.
Figure 35:
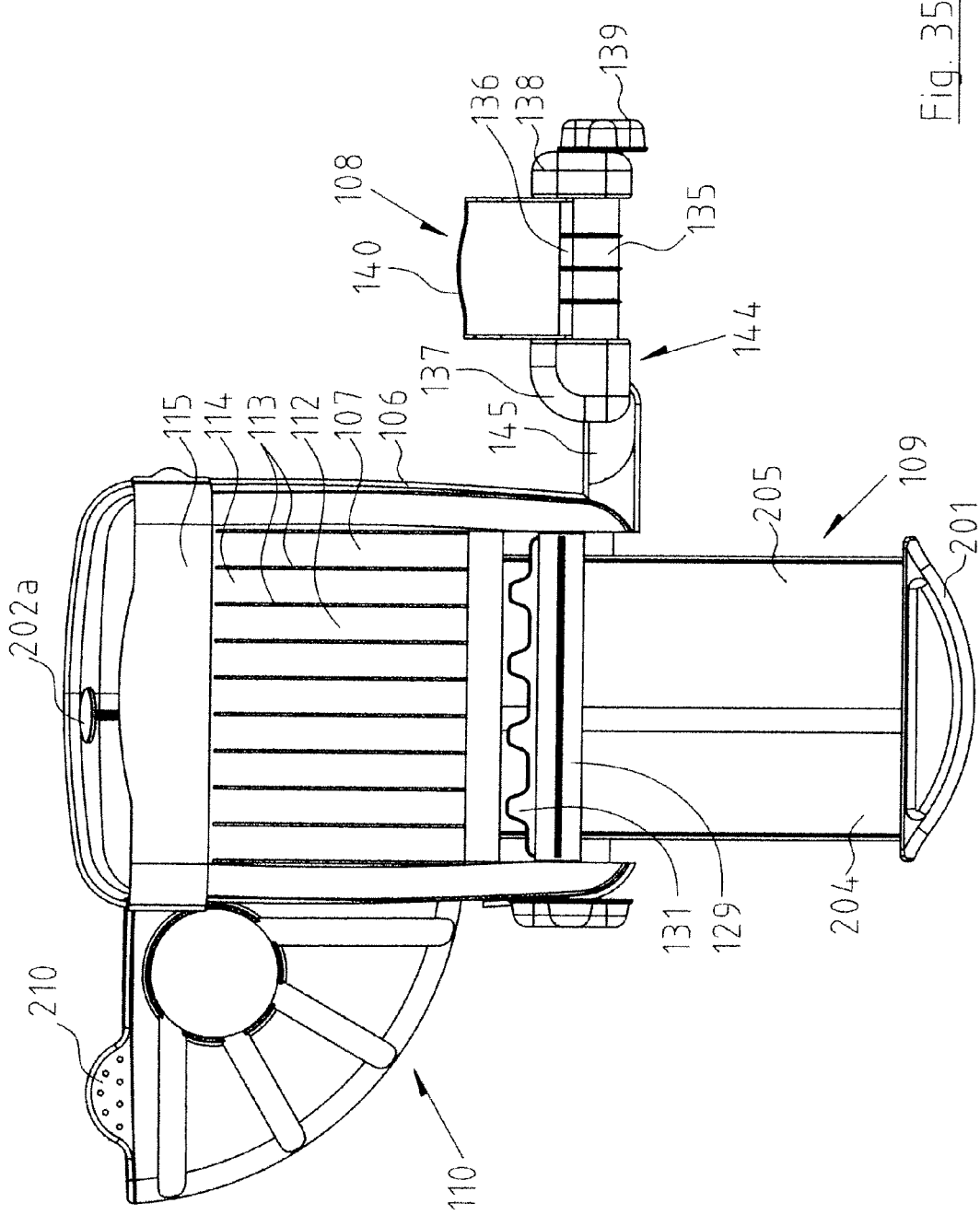
FIG. 35 is a plan view of the weaving kit shown in FIG. 28, in a position of use corresponding to that shown in FIG. 34.
Figure 40:
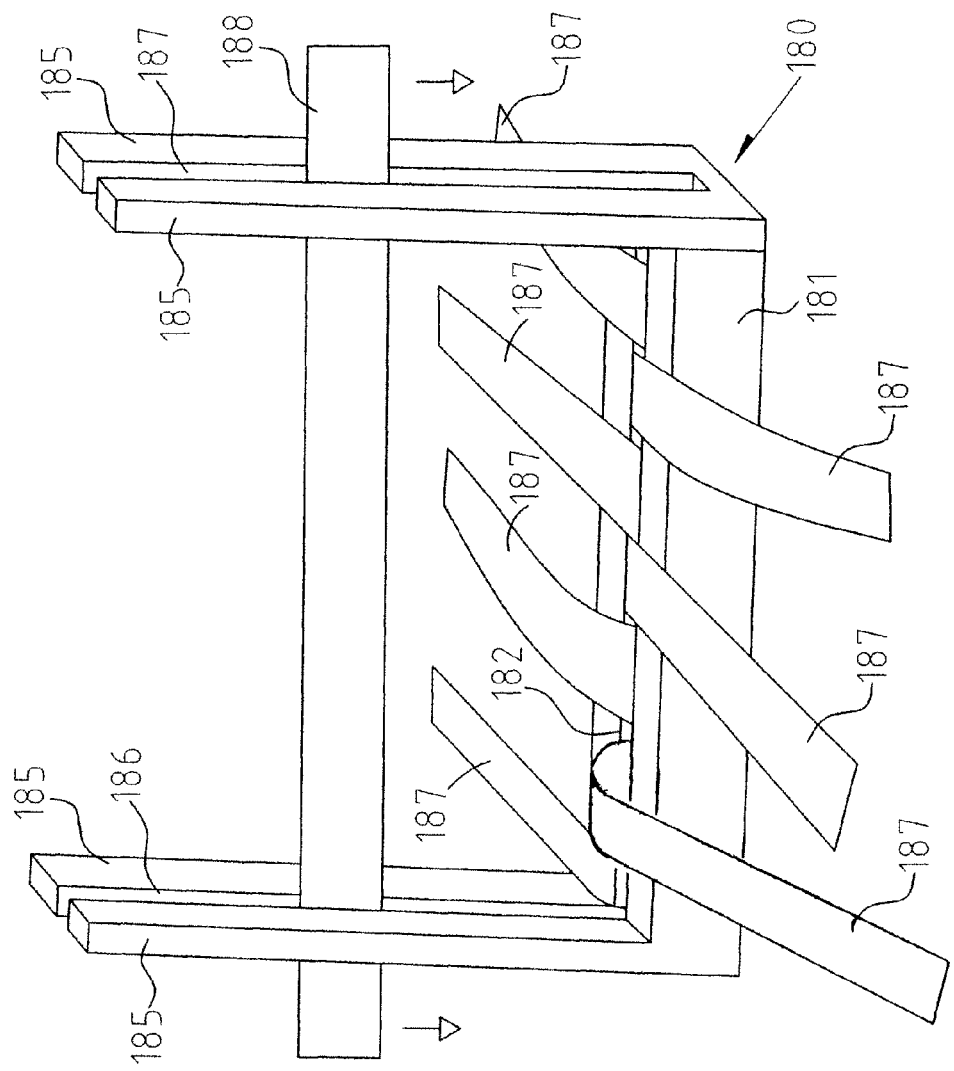
FIG. 40 is a perspective view of the weaving aid of FIG. 38, shown in use.

Referring now to FIGS. 38 to 40 there is shown a weaving aid indicated generally by the reference numeral 180. The weaving aid 180 is for weaving panels from a plurality of the weaving elements formed using the apparatus previously described. The weaving aid 180 has a base 181 with an elongate slot 182 for reception of one end of a plurality of juxtaposed weaving elements which are mounted side by side in the slot 182. Resilient sides 183, 184 of the slot 182 clamp the ends of the weaving elements therebetween. At each end of the base 181 there is provided a pair of upstanding spaced-apart guide posts 185, slots 186, 187 between each pair of posts 185 in alignment with the slot 182 in the base 181 allow a weaving element 188 to be guided downwardly for interweaving with associated weaving elements 187 clamped in the slot 182. As can be seen in FIG. 33 alternate weaving elements 187 are laid to opposite sides of the base 181 and then the weaving element 188 (forming a weft weaving element) is delivered down through the slots 186, 187 for engagement with the weaving elements 187. The weaving elements 187 are then crossed over to the opposite side of the base 181 to grip and interweave the weaving element 188. Then a further weaving element 188 is delivered down between the posts 185 for engagement with the weaving elements 187, this process being repeated to build up a panel of interwoven weaving elements 187, 188.

Figure 32:
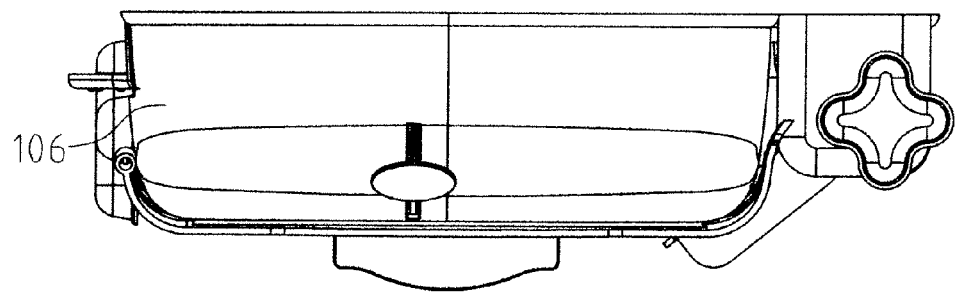
FIG. 32 is a rear end elevational view of the weaving kit shown in FIG. 28.

The posts 185 at one end of the base 181 are removable as shown in FIG. 32 to facilitate feeding the weaving elements 187 into the slot 182 in the base 181. Spigots 189 at a lower end of the posts 185 engage complementary sockets 190 in an end face of the base 181 to mount the posts 185 in an upright position at the end of the base 181.

The invention is not limited to the embodiments hereinbefore described which may be varied in both construction and detail within the scope of the appended claims.

The invention claimed is:

1. A paper weaving kit, including:
   sheet tearing apparatus having means for tearing a strip of paper of a desired width from a sheet of paper, said strip for forming a paper weaving element, and a weaving aid having means for gripping and supporting a plurality of said paper weaving elements in parallel to form a set of warp weaving elements, said gripping means engageable with the paper weaving elements such that said paper weaving elements project outwardly therefrom for interweaving with associated weft weaving elements.

2. A paper weaving kit as claimed in claim 1 wherein the gripping means is mounted on a support panel which extends outwardly from the gripping means to support the weaving elements held by the gripping means.

3. A paper weaving kit as claimed in claim 1 wherein the gripping means is a clamp.

4. A paper weaving kit as claimed in claim 2 wherein a surface of the support panel is subdivided into a number of juxtaposed lanes, each lane for reception of one of said paper weaving elements.

5. A paper weaving kit as claimed in claim 4 wherein the surface of the support panel is subdivided by a plurality of spaced-apart parallel longitudinal ribs which project above the surface of the panel and extend outwardly from the gripping means to form the lanes, a lane for reception of a paper weaving element being formed between each adjacent pair of ribs.

6. A paper weaving kit as claimed in claim 4 wherein the surface of the support panel is subdivided into lanes by indicia marked on the surface of the support panel.

7. A paper weaving kit as claimed in claim 1 wherein lifting means is provided which is operable to lift every second weaving element in a row of juxtaposed weaving elements held by the gripping means.

8. A paper weaving kit as claimed in claim 7 wherein the lifting means has a plurality of lifting arms mounted on a support and moveable between a lowered inoperative position below the support panel and a raised operative position above the support panel.

9. A paper weaving kit as claimed in claim 8 wherein the lifting means comprises a rotatable spindle mounted adjacent the support panel spaced-apart from the clamp, said rotatable spindle being rotatably mounted on a spindle support, said rotatable spindle having drive means for rotation of the spindle on the spindle support, a number of spaced-apart lifting arms projecting radially outwardly from the spindle, each lifting arm being aligned with one of the lanes on the support panel and moveable by rotation of the spindle between the inoperative position below the support panel and the raised operative position extending above the support panel.

10. A paper weaving kit as claimed in claim 9 wherein at least two sets of lifting arms are provided spaced-apart on the spindle, the lifting arms in each set of lifting arms being aligned with every second lane of the support panel and the lifting arms in a first set of lifting arms aligning with odd numbered lanes of the support panel and the lifting arms in a second set of lifting arms aligning with even numbered lanes of the support panel.

11. A paper weaving kit as claimed in claim 8 wherein the lifting arms are moveable through associated slots in the support panel for movement between the operative and inoperative positions.

12. A paper weaving kit as claimed in claim 9 wherein the spindle is mounted adjacent an end of the support panel remote from the gripping means, said lifting arms being engageable with an underside of weaving elements which project outwardly of said end of the support panel.

13. A paper weaving kit as claimed in claim 1 wherein the sheet tearing apparatus comprises a pair of elongate flaps hingedly connected together along one long edge, a free edge of one of said flaps forming a tearing edge, the width of said flap corresponding to the desired width of paper strip to be formed.

14. A paper weaving kit as claimed in claim 1 wherein the sheet tearing apparatus comprises a base panel with at least one tear flap hingedly connected thereto for reception of a paper sheet therebetween.

15. A paper weaving kit as claimed in claim 14 wherein two tear flaps are hingedly mounted at opposite sides of the base panel, said tear flaps being of different width.

16. A paper weaving kit as claimed in claim 14 wherein a clip is mounted on the base panel for engaging and holding an inner edge of a sheet mounted between the base panel and the tear flap, a slot being provided in the tear flap to receive the clip when the tear flap is folded against the base panel.

17. A paper weaving kit as claimed in any claim 1 which includes a fold indicator apparatus operable for marking fold lines on a paper strip to facilitate folding said paper strip to form the paper weaving element.

18. A paper weaving kit as claimed in claim 17 wherein the fold indicator apparatus comprises a crimping device for crimping fold lines in the paper strip.

19. A paper weaving kit as claimed in claim 18 wherein the crimping device has a pair of rotatable rollers for reception and through passage of the paper strip between the rollers, said rollers being rotatably mounted on a roller support, drive means for rotation of the rollers on the roller support, one or more circumferential ribs projecting outwardly of a first roller of said rollers, a complementary circumferential groove associated with each rib being provided in a second roller of said rollers.

20. A paper weaving kit as claimed in claim 19 wherein a feed chute is provided for delivering a paper strip between the rollers.

21. A paper weaving kit as claimed in claim 20 wherein the feed chute has guide means for delivering the paper strip in a desired orientation to the rollers.

22. A paper weaving kit as claimed in claim 21 wherein the chute comprises a flat slide panel with upstanding flanges at each side of the slide panel which form the guide means.

23. A paper weaving kit as claimed in claim 1 which includes a housing incorporating the weaving aid and on which the sheet tearing apparatus is mounted.

24. A paper weaving kit as claimed in claim 23 wherein the sheet tearing apparatus is slidably mounted in an associated socket on the housing.

25. A paper weaving kit as claimed in claim 19 wherein the crimping device is mounted on the housing.

26. A paper weaving kit as claimed in claim 25 wherein the crimping device is attached to the housing by a swivel mount which allows movement of the crimping device between a stored position against the housing and an outwardly extended in-use position.

27. A paper weaving kit as claimed in claim 23 wherein a storage drawer is mounted on the housing.

28. A paper weaving kit as claimed in claim 23 wherein the housing has a top forming the weaving aid with a downwardly depending side wall within which are housed the sheet tearing apparatus and the storage drawer beneath the weaving aid.

29. A paper weaving kit as claimed in claim 28 wherein the spindle of the lifting means is rotatably mounted between opposite sides of the side wall.

30. A paper weaving kit as claimed in claim 1 which includes an elongate shaper strip about which the paper strip can be wrapped to form a weaving element of a desired width.

31. A paper weaving kit as claimed in claim 1 wherein the kit includes an elongate paper rolling rod having a paper gripping notch at one end.

32. A paper weaving kit as claimed in claim 1 wherein the kit includes a former having a body in a desired shape about which weaving elements can be woven to create an article of said desired shape.

* * * * *